(12) United States Patent
Kondo

(10) Patent No.: US 10,495,044 B2
(45) Date of Patent: Dec. 3, 2019

(54) CONTROL APPARATUS FOR VEHICLE, AND CONTROL METHOD FOR VEHICLE

(71) Applicant: TOYOTA JIDOSHA KABUSHIKI KAISHA, Toyota-shi (JP)

(72) Inventor: Yumi Kondo, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/946,329

(22) Filed: Apr. 5, 2018

(65) Prior Publication Data

US 2018/0298863 A1 Oct. 18, 2018

(30) Foreign Application Priority Data

Apr. 13, 2017 (JP) ................................. 2017-079828

(51) Int. Cl.
*F02N 11/08* (2006.01)

(52) U.S. Cl.
CPC ........ *F02N 11/084* (2013.01); *F02N 11/0825* (2013.01)

(58) Field of Classification Search
CPC ............... F02N 11/0825; F02N 11/084; F02N 11/0814; F02N 11/0844; F02N 11/0803; F02N 11/0818; Y02T 10/48
See application file for complete search history.

(56) References Cited

U.S. PATENT DOCUMENTS

| 2004/0055305 | A1 | 3/2004 | Kuroda et al. | |
| 2006/0224279 | A1* | 10/2006 | Mori | F02N 11/0833 701/1 |
| 2007/0256657 | A1 | 11/2007 | Celisse et al. | |
| 2010/0106390 | A1* | 4/2010 | Yamaguchi | B60W 10/08 701/102 |
| 2015/0211468 | A1* | 7/2015 | Ezumi | F02N 11/0825 701/112 |
| 2017/0145977 | A1* | 5/2017 | Toyama | F02D 41/042 |

FOREIGN PATENT DOCUMENTS

JP 2004-84479 3/2004

* cited by examiner

*Primary Examiner* — Sizo B Vilakazi
(74) *Attorney, Agent, or Firm* — Oblon, McClelland, Maier & Neustadt, L.L.P.

(57) ABSTRACT

The electronic control unit determines whether or not an battery state of charge is equal to or above a first state of charge, and determines, based on the result of a determination, whether or not to allow a next automatic stop of an engine while the engine is driven by automatic restart after each automatic stop of the engine. The electronic control unit allows the next automatic stop of the engine when determining that the battery state of charge is equal to or above the first state of charge, and prohibits automatic stop of the engine until the vehicle starts traveling, when determining that the battery state of charge is less than the first state of charge.

4 Claims, 7 Drawing Sheets

CONTROL APPARATUS FOR VEHICLE, AND CONTROL METHOD FOR VEHICLE

INCORPORATION BY REFERENCE

The disclosure of Japanese Patent Application No. 2017-079828 filed on Apr. 13, 2017 including the specification, drawings and abstract is incorporated herein by reference in its entirety.

BACKGROUND

1. Technical Field

The present disclosure relates to control apparatuses for a vehicle and control methods for the vehicle. The present disclosure particularly relates to a control apparatus for a vehicle and a control method for the vehicle that allow execution of automatic stop and restart control of an engine a plurality of times at one time when the vehicle stops.

2. Description of Related Art

Automatic stop and restart control (so-called stop and start control (S&S control)) has conventionally been known. In the S&S control, when a specified automatic stop condition is established, an engine is automatically stopped, whereas when the specified automatic restart condition is established during automatic stop of the engine, the engine is automatically restarted for achieving enhanced fuel efficiency.

In a vehicle using an engine as a driving source, a vehicle cabin is generally air-conditioned with use of cold air obtained by an air conditioner (also referred to as AC below) operated by a compressor that is driven by the engine and with use of warm air obtained using the heat from an engine coolant. In such S&S control, the engine is stopped though it is a temporal stop. Accordingly, various control methods have been proposed for the S&S control in order to achieve enhanced fuel efficiency by stopping the engine, while keeping the vehicle cabin comfortable by automatically restarting the engine that is the source of the cold air and the warm air.

For example, Japanese Patent Application Publication No. 2004-084479 discloses a technique in which engine stop is permitted when the power of a compressor by a motor is larger than the power of the compressor requested from an AC, and engine restart is permitted when the power of the compressor exceeds the power by the motor and when a residual capacity of the battery that drives the motor becomes lower than a specified value. According to the disclosure in JP 2004-084479 A, it is possible to keep the vehicle cabin comfortable, while stopping the engine as much as possible for fuel saving.

SUMMARY

Recently, in order to achieve further enhancement in fuel efficiency, so-called multi S&S control has started to be performed while a vehicle is in "long temporary stop" which tends to be caused by such factors as traffic congestion, waiting for a traffic light, and waiting for crossing. In the multi S&S control, S&S control is executed a plurality of times at one time when the vehicle stops.

If the disclosure in JP 2004-084479 A is applied to the multi S&S control, the AC is operated with the motor as a driving source during engine stop, whereas while the engine is driven by automatic restart, the AC is operated and the state of charge of a battery is increased with the engine as a driving source. Accordingly, it may be possible to achieve enhanced fuel efficiency while keeping the vehicle cabin comfortable.

However, in the multi S&S control, a period of time of automatically restarting the engine in order to, for example, recover the state of charge of the battery is often set to about tens of seconds (for example, 30 seconds). However, the battery discharges electric power during engine stop for several seconds to tens of seconds (for example, 8 seconds to 30 seconds) depending on the condition of use of electrical components and the like. Therefore, if the disclosure of JP 2004-084479 A is applied to the multi-S&S control without any change, there is a possibility that automatic stop and automatic restart of the engine may repeatedly occur in a relatively short cycle (for example, every 30 seconds).

Here, "comfortability" in the vehicle cabin includes not only physical comfort provided by cold air and warm air, but also psychological comfort such as "comfort in mind." Accordingly, when stop and restart of the engine is automatically repeated in a short cycle, during "long temporary stop" which essentially tends to induce irritation, even though the driver does not perform any operation at all, the driver may feel busyness or irritation, which may cause a problem of disturbed psychological comfort.

The present disclosure achieves, in a control apparatus for a vehicle that can perform S&S control a plurality of times at one time when the vehicle stops, enhancement in fuel efficiency, while enhancing both physical comfort and psychological comfort in a vehicle cabin during long temporary stop.

A first aspect of the present disclosure relates to a control apparatus for a vehicle. The vehicle includes an engine. The electronic control unit is able to execute restart control a plurality of times at one time when the vehicle stops. The restart control is a control that automatically stops the engine when a specified automatic stop condition is established and automatically restarts the automatically stopped engine either when a specified automatic restart condition is established or when the automatic stop condition is not satisfied. The automatic stop condition includes a specified status value that changes toward a unsatisfied side of the automatic stop condition during automatic stop of the engine, while changing toward an establishment side of the automatic stop condition during driving of the engine. The electronic control unit is configured to determine whether or not the status value is in a first region. The first region is such that a relatively long time is taken until the automatic stop condition is not satisfied due to change in the status value during automatic stop of the engine. The electronic control unit is configured to determine, based on the result of a determination by the electronic control unit, whether or not to allow a next automatic stop of the engine while the engine is driven by automatic restart after each automatic stop of the engine. The electronic control unit is configured to allow the next automatic stop of the engine when determining that the status value is in the first region, and is configured to prohibit automatic stop of the engine until the vehicle starts traveling, when determining that the status value is out of the first region With the configuration, it is determined whether or not to allow the next automatic stop of the engine "while the engine is driven by automatic restart after each automatic stop of the engine." Accordingly, when a specified automatic stop condition is established while the vehicle stops, automatic stop of the engine is performed at least once. Accordingly, for example, unlike the case of control which prohibits automatic stop of the engine without exception when the status value is out of the specified region, the automatic stop of the engine in normal S&S is not unnecessarily restricted. As a consequence, minimal enhancement in fuel efficiency can be achieved.

In the control apparatus, the automatic stop condition may include that the status value is in a second region. The second region may include the first region and a region other than the first region such that the second region is larger than the first region. With the configuration, the second region is set to be larger than the first region. In other words, a determination criteria for the repetition condition of automatic engine stop is set to be stricter than that for the individual establishment conditions of the automatic stop of the engine. Accordingly, it is possible to reliably suppress repetition of automatic stop and automatic restart of the engine in a short cycle. Therefore, not only the physical comfort but also the psychological comfort in the vehicle cabin during long temporary stop can be enhanced.

In the control apparatus, the electronic control unit may be configured to execute the determination before each automatic stop of the engine is performed. The electronic control unit may be configured to determine whether or not to allow the next automatic stop of the engine based on the result of the determination executed before last automatic stop of the engine.

With the configuration, it is determined whether or not the status value is in the first region before the n-th (n is a positive integer) automatic stop of the engine is performed. The determination may be made based on the status value before the status value is subjected to consumption or the like by the n-th automatic stop of the engine. It is determined, based on the result of the determination made before the last (n-th) automatic stop of the engine, whether or not to allow the next (n+1st) automatic stop of the engine while the engine is driven by the n-th automatic restart.

Thus, whether or not to allow the n+1st automatic stop of the engine is determined based on the result of the determination made before the n-th automatic stop of the engine. Accordingly, unnecessary prohibition of automatic stop of the engine can be suppressed. Moreover, since it is less likely that relatively short automatic stop and relatively short automatic restart continue three or more times, the driver feeling busyness or irritation can be suppressed. Therefore, it becomes possible to perform multi S&S control that allows balanced enhancement in fuel efficiency and in comfort in the vehicle cabin.

In the control apparatus, the status value may be a value out of a state of charge of a battery, an evaporator temperature of an air conditioning device, a negative brake pressure, and an engine coolant temperature, the value having a lowest speed in change toward the establishment side of the automatic stop condition during driving of the engine.

A battery used as a power source of electrical components, an evaporator having an air conditioning function, a brake negative pressure that assists tread strength of a brake pedal, and an engine coolant temperature that generates warm air during automatic stop of the engine are each an important element to establish the condition for automatic stop of the engine. Out of the elements, one having a lowest speed (recovery speed) in change toward the establishment side of the stop condition while the engine is driven is set as a status value in the configuration. Accordingly, whether or not to allow the next and subsequent automatic stop of the engine can appropriately be determined in view of whether or not the status value can be recovered by relatively short automatic restart of the engine. This makes it possible to suppress repetition of the automatic stop and automatic restart of the engine in a short cycle.

A second aspect of the present disclosure relates to a control method of a vehicle. The vehicle includes an engine and an electronic control unit. The electronic control unit is able to execute restart control a plurality of times at one time when the vehicle stops. The control method includes: determining, by the electronic control unit, whether or not a status value is in a first region; determining, by the electronic control unit, based on a result of a determination by the electronic control unit, whether or not to allow a next automatic stop of the engine while the engine is driven by automatic restart after each automatic stop of the engine; and allowing, by the electronic control unit, the next automatic stop of the engine when determining that the status value is in the first region, and prohibiting automatic stop of the engine until the vehicle starts traveling, when determining that the status value is out of the first region. The restart control is a control that automatically stops the engine when a specified automatic stop condition is established and automatically restarts the automatically stopped engine either when a specified automatic restart condition is established or when the automatic stop condition is not satisfied. The automatic stop condition includes a specified status value that changes toward a unsatisfied side of the automatic stop condition during automatic stop of the engine and changes toward an establishment side of the automatic stop condition during driving of the engine. The first region is such that a relatively long time is taken until the automatic stop condition is not satisfied due to change in the status value during automatic stop of the engine.

With to the configuration, whether or not to allow the next automatic stop of the engine is decided "while the engine is driven by automatic restart after each automatic stop of the engine." Accordingly, when a specified automatic stop condition is established while the vehicle stops, automatic stop of the engine is performed at least once. Accordingly, for example, unlike the case of control which prohibits automatic stop of the engine without exception when the status value is out of the specified region, the automatic stop of the engine in normal S&S is not unnecessarily restricted. As a consequence, minimal enhancement in fuel efficiency can be achieved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENT

Hereinafter, modes for carrying out the present disclosure will be described with reference to the drawings.

Figure 1:
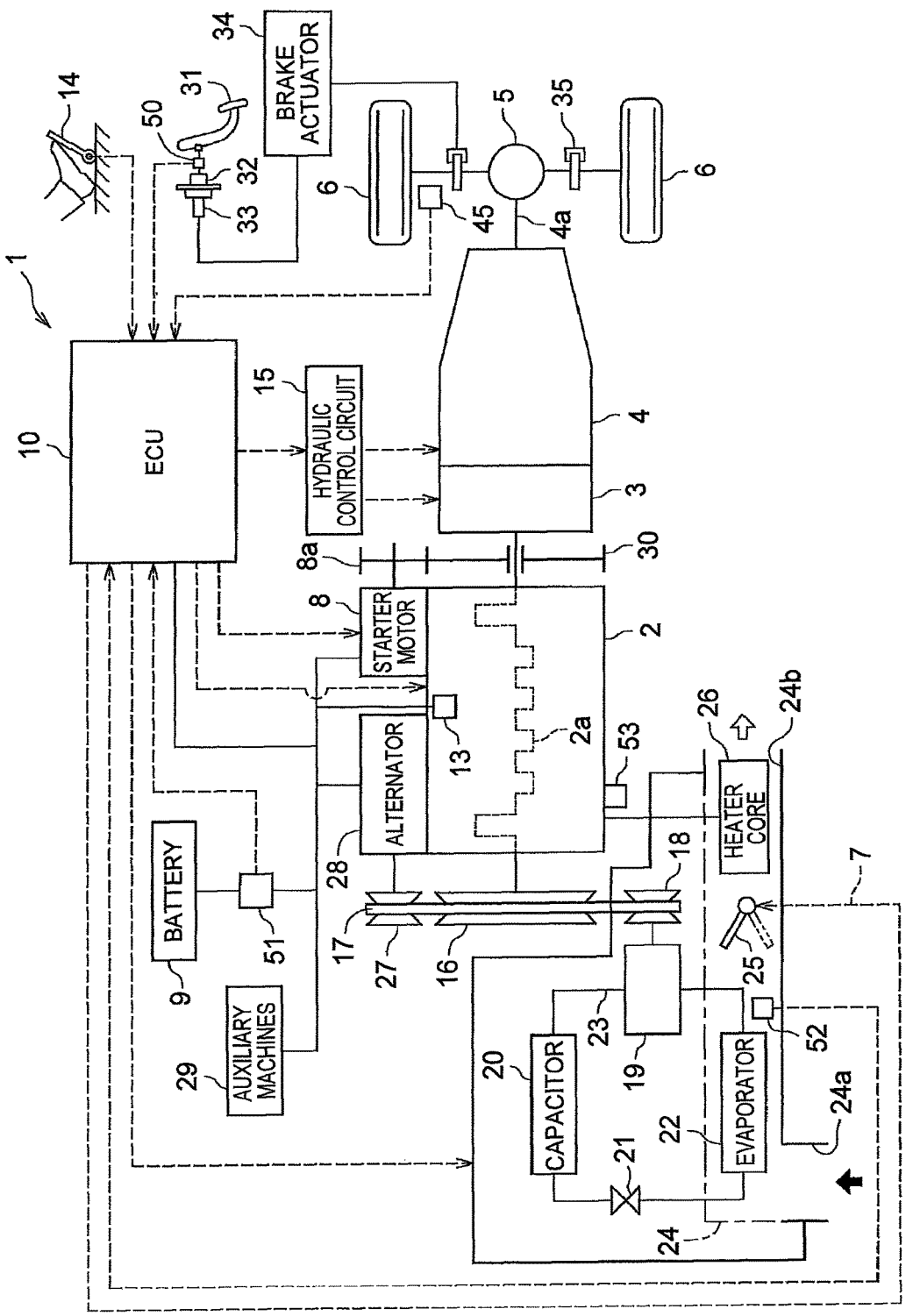
FIG. 1 schematically illustrates a principal part of a vehicle according to an embodiment of the present disclosure.

FIG. 1 illustrates a principal part of a vehicle 1 according to an embodiment of the present disclosure. As illustrated in FIG. 1, the vehicle 1 includes an engine 2 as a driving source, a torque converter 3 as a fluid coupling, an automatic transmission 4, an air conditioner 7 that performs air-conditioning in a vehicle cabin, a starter motor 8 that starts up the engine 2, a battery 9 that supplies electric power to electronic components such as the starter motor 8 and an igniter 13, and an ECU 10 as a control apparatus.

In the vehicle 1, driving force (torque) output from a crankshaft 2a of the engine 2 as a driving source is transmitted to the automatic transmission 4 through the torque converter 3. The torque is converted to have an appropriate gear ratio in the automatic transmission 4 and is output through an output shaft 4a. The torque is finally transmitted to right and left driving wheels 6, 6 through a differential gear 5. The ECU 10 executes control including control of the engine 2, and shifting control of the automatic transmission 4. In addition, the ECU 10 executes so-called stop and start control (S&S control).

The engine 2 is configured as a gasoline engine having such components as an electrically controlled throttle valve 11 (see FIG. 2), an injector 12 (see FIG. 2), and an igniter 13. The throttle valve 11 is used for controlling an intake air amount. The injector 12 is used for controlling the supply amount and supply time of fuel. The igniter 13 is used for controlling ignition timing. The ECU 10 basically control the components in accordance with the operation amount of an accelerator pedal 14 operated by a driver.

The torque converter 3 includes a pump impeller (not illustrated) coupled with the crankshaft 2a, a turbine runner (not illustrated) coupled with the automatic transmission 4, a stator (not illustrated) having a torque amplifying function, and a lock-up clutch (not illustrated) for directly linking the engine 2 and the automatic transmission 4. The pump impeller and the turbine runner are configured to transmit driving force through fluid. At the time of high speed traveling and the like, the lock-up clutch directly links the pump impeller and the turbine runner so as to increase transmission efficiency of the driving force from the engine 2 to the automatic transmission 4.

The automatic transmission 4 is configured as a planetary gear type stepped automatic transmission that provides a plurality of gear stages different in gear ratio according to engagement and disengagement states of a plurality of clutches and a brake. More specifically, the automatic transmission 4 is configured to provide, through selective engagement and disengagement of the plurality of clutches and the brake in accordance with the hydraulic pressure supplied from the hydraulic control circuit 15, forward gear stages in first gear to sixth gear and a reverse gear stage, in response to the engagement and disengagement states of the plurality of clutches and the brake.

Aside from such a driving force transmission system from the engine 2 to the driving wheels 6, 6, the driving force output from the engine 2 is transmitted to a belt 17 through a pulley 16 connected to the crankshaft 2a. The driving force transmitted to the belt 17 rotates a pulley 18 coupled with a compressor 19 of the air conditioner 7 and a pulley 27 coupled with an alternator 28. That is, when the crankshaft 2a rotates, the driving force output from the engine 2 drives the compressor 19 and the alternator 28.

The air conditioner (air conditioning device) 7 includes a draft air duct 24 extending from a suction port 24a for taking in air to an outlet port 24b in the vehicle cabin. The draft air duct 24 includes a blower (not illustrated), an evaporator 22, an air-mix damper 25, and a heater core 26.

The blower takes in air from the suction port 24a (see a black arrow of FIG. 1) and sends the intake air through the draft air duct 24 toward the outlet port 24b (see a white arrow of FIG. 1). The evaporator 22 communicates with the compressor 19, a capacitor 20 as a condenser, and an expansion valve 21 used as decompressing means, through a coolant circuit 23. A refrigeration cycle is executed when coolant circulates through the coolant circuit 23. Accordingly, refrigerant gas having temperature and pressure increased through compression by the compressor 19 is cooled and temporarily liquefied in the capacitor 20, and then is expanded again in the expansion valve 21 to be a low-temperature and low-pressure refrigerant gas. In this state, the refrigerant gas is sent to the evaporator 22. The heater core 26 provided on the downstream side of the evaporator 22 receives engine coolant that is warmed up by passing through the engine 2.

The air flowing through the draft air duct 24 by the blower first passes through the evaporator 22, where the air is deprived of latent heat and turns into dehumidified cold air. The air-mix damper 25 divides the cooled air into air passing through the heater core 26 and air not passing through the heater core 26. The air passing through the heater core 26 is warmed by heat exchange with the engine coolant introduced into the heater core 26. The air not passing through the heater core 26 is sent to the outlet port 24b as cold air, and is mixed with the air warmed by the heater core 26. That is, the temperature of the air blowing into the vehicle cabin from the outlet port 24b is determined depending on the ratio of the air divided in the air-mix damper 25.

The alternator 28 is configured to be able to operate with the driving force of the engine 2 to generate electric power. The electric power generated in the alternator 28 is supplied, for example, to the starter motor 8, the igniter 13, and auxiliary machines 29 such as an audio system and a car navigation system. The electric power generated in the alternator 28 is converted into a direct current by a rectifier (not illustrated), and is charged into the battery 9.

Upon reception of the electric power from the battery 9, a pinion gear 8a provided in an output shaft of the starter motor 8 rotates. The pinion gear 8a gears with a ring gear provided on the outer circumference of a flywheel 30, so that the engine 2 is started up. The starter motor 8 performs cranking of the engine 2 at the time of cold start, and at the time of start-up by ignition key operation by a driver, as well as at the time of automatic restart of the engine after automatic stop of the engine in S&S control (at the time of driving the engine by automatic restart).

For example, the battery 9 is constituted of a secondary cell such as a lithium ion battery, a nickel-hydrogen battery, and a lead storage battery, and a capacitor. The battery 9 supplies electric power not only to the starter motor 8 and the igniter 13, but also to meters, the ECU 10, and the auxiliary machines 29 (electronic components at large), such as an audio system, a car navigation system, lighting devices, and a seat heater.

In the vehicle 1, braking force is imparted to the driving wheels 6 in accordance with operation of a brake pedal 31. More specifically, a brake booster 32 amplifies the operating force of the brake pedal 31 in response to the stepping-in operation of the brake pedal 31, and a master cylinder 33 converts the amplified operating force into hydraulic pressure that generates the braking force of the vehicle 1. The hydraulic pressure from the master cylinder 33 is controlled by a brake actuator 34, and then is transmitted to wheel cylinders 35 used as hydraulic pressure braking units provided in each of the driving wheels 6. Thus, the braking force is imparted to each of the driving wheels 6.

Figure 2:
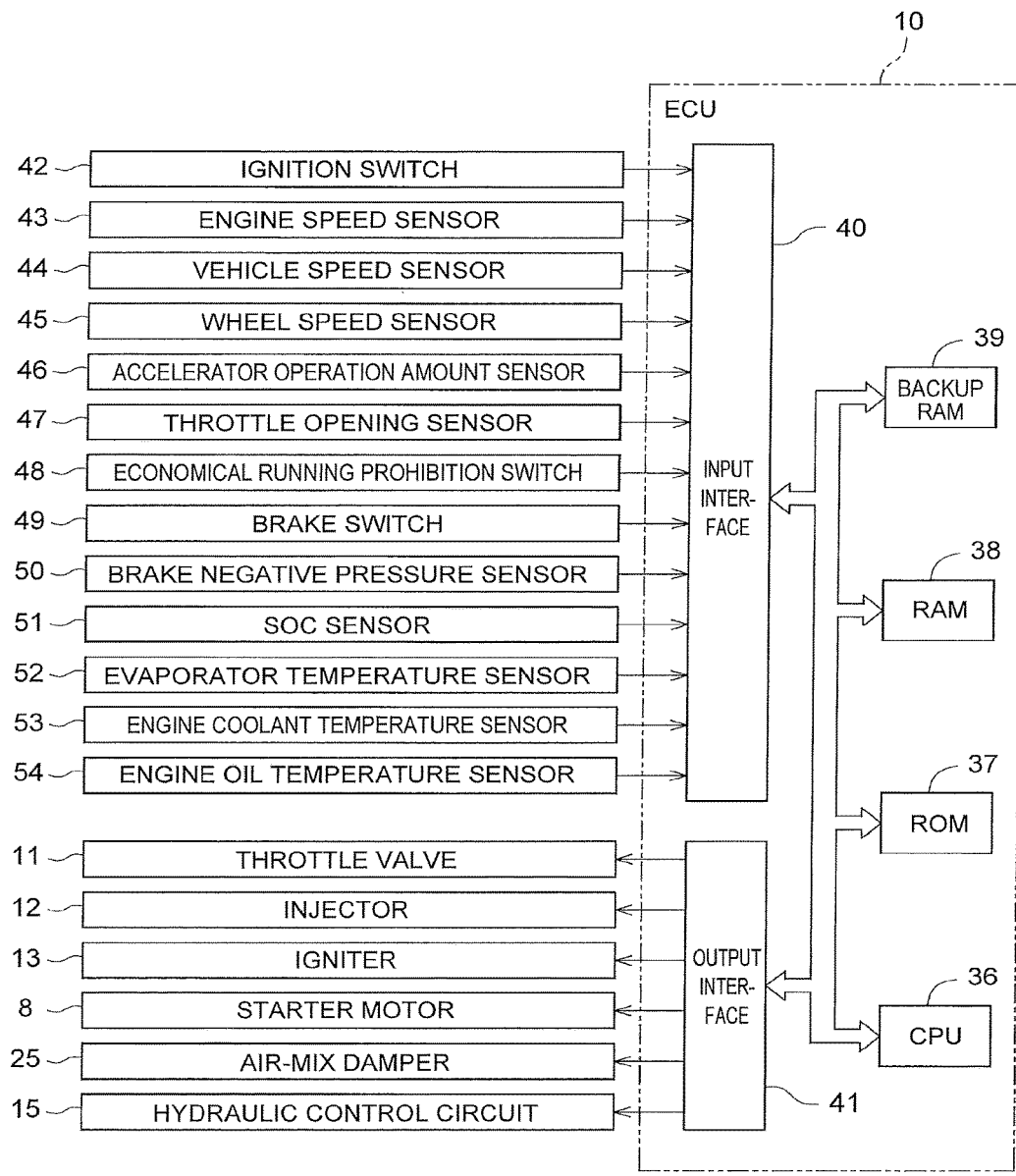
FIG. 2 is a block diagram schematically illustrating a control system.

FIG. 2 is a block diagram schematically illustrating a control system. The electric control unit (ECU) 10 includes a so-called microcomputer including, for example, a central processing unit (CPU) 36, a read only memory (ROM) 37 in which data, such as programs executed by the CPU 36, and maps, are stored, a random access memory (RAM) 38 having data temporarily stored as necessary by the CPU 36, a backup RAM 39 that holds data even while the power source is interrupted, an input interface 40, and an output interface 41. The CPU 36 executes various control of the vehicle 1 by performing signal processing in accordance with the programs prestored in the ROM 37, while using a temporary storage function of the RAM 38.

The ECU 10 receives input of signals through the input interface 40. Examples of the signals include a signal representing the position of an ignition switch 42 set as a start position by operation of an ignition key (not illustrated), a signal representing the engine speed detected by an engine speed sensor 43, a signal representing the speed of the output shaft 4a of the automatic transmission 4 corresponding to the vehicle speed V detected by a vehicle speed sensor 44, a signal representing the speed of the driving wheels 6, 6 detected by a wheel speed sensor 45, a signal representing an accelerator operation amount detected by an accelerator operation amount sensor 46, a signal representing an opening degree of the throttle valve 11 detected by a throttle opening sensor 47, a signal coming from an economical running prohibition switch 48 to represent whether or not the driver prohibits implementation of S&S control, a signal representing ON operation and OFF operation of the brake pedal 31 detected by a brake switch 49, a signal representing brake negative pressure detected by a brake pressure sensor 50, a signal representing the state of charge (also referred to as SOC below) of the battery 9 detected by a SOC sensor 51, a signal representing the temperature of the evaporator 22 detected by an evaporator temperature sensor 52, a signal representing the temperature of engine coolant (engine coolant temperature) detected by an engine coolant temperature sensor 53, and a signal representing the temperature of engine oil (engine oil temperature) detected by an engine oil temperature sensor 54.

Based on the input signals from the various sensors, the ECU 10 outputs signals through the output interface 41. Examples of the signals include engine output control command signals for output control of the engine 2, a hydraulic control command signal for control of the hydraulic control circuit 15 with respect to shifting of the automatic transmission 4, and a driving control signal to the starter motor 8. Examples of the engine output control command signals may include a throttle signal for controlling opening and closing of the throttle valve 11, a signal for controlling the injection amount and injection timing of the fuel injected from the injector 12, and a signal for controlling the ignition timing of a spark plug (not illustrated) by the igniter 13. The ECU 10 executes control such as output control of the engine 2, shifting control of the automatic transmission 4, and drive control of the starter motor 8 through the control signals.

The ECU 10 regulates the temperature in the vehicle cabin through the air conditioner 7. Specifically, the ECU 10 performs opening degree control of the air-mix damper 25 so as to retain a vehicle cabin temperature set with an indoor control panel (illustration omitted).

The ECU 10 further executes automatic stop and restart control (S&S control) that automatically stops the engine 2 when a specified automatic stop condition is established, and automatically restarts the automatically stopped engine 2 when a specified automatic restart condition is satisfied. Specifically, when determining that the automatic stop condition is established, the ECU 10 executes fuel cut control that stops fuel supply to a combustion chamber of the engine 2. When determining that the automatic restart condition is established during automatic stop of the engine, the ECU 10 starts fuel supply to the combustion chamber of the engine 2, and automatically restarts the engine 2 with the starter motor 8.

Here, for example, the specified automatic stop condition includes following conditions (1) to (9): (1) the economical running prohibition switch 48 is turned off; (2) the accelerator pedal 14 is not stepped on (detected by the accelerator operation amount sensor 46); (3) the brake is turned on (detected by the brake switch 49); (4) the vehicle 1 is stopped (vehicle speed V is 0 km/h) (detected by the wheel speed sensor 45); (5) the brake negative pressure is equal to or above a specified second pressure (detected by the brake pressure sensor 50); (6) the SOC is equal to or above a specified second state of charge (detected by the SOC sensor 51); (7) the temperature of the evaporator 22 is equal to or below a specified second temperature (detected by the evaporator temperature sensor 52); (8) the engine coolant temperature is equal to or above a specified second coolant temperature (detected by the engine coolant temperature sensor 53); and (9) the engine oil temperature is equal to or above a specified oil temperature (detected by the engine oil temperature sensor 54). When the conditions (1) to (9) are all satisfied, the ECU 10 determines that the automatic stop condition is established.

Now, the automatic stop condition includes, in addition to the conditions ((1) to (4)) established based on the intention of the driver, "specified status values" that change toward a failure side of the automatic stop condition during automatic stop of the engine, and change toward an establishment side of the automatic stop condition during driving of the engine. Examples of such status values include: (6) the SOC that decreases (changes toward the failure side) due to stop of the alternator 28 during automatic stop of the engine, and increases (changes toward the establishment side) due to operation of the alternator 28 during driving of the engine; (7) the temperature of the evaporator 22 (hereinafter also referred to as evaporator temperature) that increases (changes toward the failure side) due to stop of the compressor 19 during automatic stop of the engine, and decreases (changes toward the establishment side) due to operation of the compressor 19 during driving of the engine; and (8) the engine coolant temperature that decreases (changes toward the failure side) during automatic stop of the engine, and increases (changing toward the establishment side) during driving of the engine.

The brake negative pressure in the condition (5) does not naturally decrease during automatic stop of the engine. However, the brake negative pressure is included in "specified status values" because when, for example, the driver further steps on the brake pedal 31, the brake negative pressure decreases (the brake pedal becomes stiff), and the brake negative pressure does not increase (recover) unless the engine 2 is driven and negative pressure is drawn from an intake passage.

Therefore, the automatic restart condition during stop of the vehicle include, for example, following conditions (a) to (f): (a) the accelerator pedal 14 is stepped on and the brake is turned off; (b) the brake negative pressure is less than the second pressure; (c) the SOC is less than the second state of charge; (d) the temperature of the evaporator 22 is higher than the second temperature; (e) the engine coolant temperature is less than the second coolant temperature; and (f) the engine oil temperature is less than the specified oil temperature. When any one of the above conditions is satisfied during automatic stop of the engine, the ECU 10 determines that the automatic restart condition is established, starts fuel supply to the combustion chamber of the engine 2, and automatically restarts the engine 2 with the starter motor 8.

In addition, the ECU 10 is configured to be able to perform control (hereinafter also referred to as multi S&S control) configured to perform S&S control a plurality of times at one time when the vehicle stops, the S&S control being configured to automatically stop the engine 2 when the specified automatic stop condition is established, and to automatically restart the automatically stopped engine 2 when the specified automatic restart condition is established or when the automatic stop condition is failed.

The multi S&S control is performed, for example, while the vehicle is in "long temporary stop" which tends to be caused by such factors as traffic congestion, waiting for a traffic light, and waiting for crossing. The multi S&S control repeats automatic stop and automatic restart at one time when the vehicle stops in order to achieve further enhancement in fuel efficiency.

In the multi S&S control, when one of the status values is failed after automatic stop of the engine, automatic restart of the engine 2 is basically performed for predetermined time T so as to recover the status value. Accordingly, automatic stop and automatic restart is repeated at one time when the vehicle stops. In this regard, the condition for automatic stop of the engine in the multi S&S control may include (10) predetermined time T elapses after automatic restart of the engine 2, in addition to the conditions (1) to (9). "The case where the automatic stop condition is failed" includes the case of (b) to (f), for example.

Accordingly, during the automatic stop of the engine, the SOC is used to operate the audio system, the low-temperature evaporator 22 is used to generate cold air, and high engine coolant temperature is used to generate warm air, whereas during driving of the engine by automatic restart, the alternator 28 is operated to recover the SOC, and the compressor 19 is operated to lower the evaporator temperature or to increase the engine coolant temperature. By repeating this operation, further enhancement in fuel efficiency can be achieved, while the vehicle cabin can be kept comfortable.

In the multi S&S control, the predetermined time T for automatically restarting the engine 2 in order to, for example, recover the SOC is often set to about tens of seconds (for example, 30 seconds). However, the discharge speed of the battery 9 during stop of the engine considerably differs depending on the condition of use of electrical components and the like.

Figure 3:
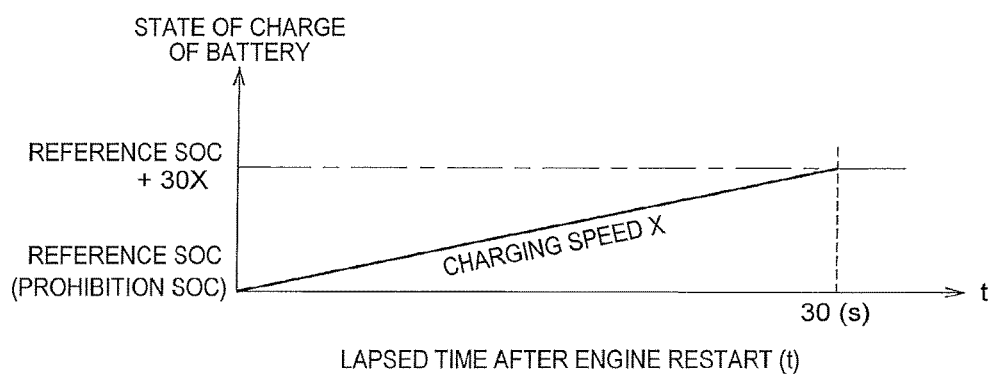
FIG. 3 schematically illustrates one example of relation between lapsed time after automatic restart of an engine and a state of charge of a battery.

FIG. 3 schematically illustrates one example of relation between lapsed time after automatic restart of the engine and the SOC. When it is assumed that charging speed of the battery 9 is X, and engine automatic restart time is 30 seconds, the SOC reaches a reference SOC (prohibition SOC) during automatic stop of the engine as illustrated in FIG. 3. Accordingly, the automatic stop condition is failed, and even when the engine 2 is automatically restarted, the SOC reaches only up to a reference SOC+30X (the SOC recovers only by 30X).

Examples of the condition of use of electrical components and the like may include: (Case 1) only the starter motor 8 and the igniter 13 are used; (Case 2) the navigation system and the audio system are used in addition to Case 1; and (Case 3) components such as the lighting devices and the seat heater are used in addition to Case 1 and Case 2. With the recovered state of charge 30X, the electrical components and the like may be used, for example, for 20 seconds to 30 seconds in Case 1, for 13.3 seconds to 20 seconds in Case 2, and for 8 seconds to 12 seconds in Case 3.

Therefore, in the case where, for example, the multi S&S control is performed when the SOC is close to the reference SOC, automatic stop and automatic restart of the engine may repeatedly occur in a relatively short cycle (for example, every 30 seconds).

Here, "comfortability" in the vehicle cabin includes not only physical comfort provided by cold air and warm air, but also psychological comfort such as "comfort in mind." When automatic stop and automatic restart of the engine 2 is repeated in a short cycle, during "long temporary stop" which essentially tends to induce irritation, even though the driver does not perform any operation at all, the driver may feel busyness or irritation, which may disturb the psychological comfort.

Accordingly, in the present embodiment, whether or not to allow the next automatic stop condition of the engine 2 is determined based on a specified status value included in the automatic stop condition of the engine 2, the status value changing toward a recovery side during driving of the engine. Here, examples of "specified status value" may include the SOC, the evaporator temperature, the brake negative pressure, and the engine coolant temperature. The battery 9 used as a power source of the electrical components and the like, the evaporator 22 having an air conditioning function, the brake negative pressure that assists tread strength of the brake pedal 31, and the engine coolant temperature that generates warm air are each an important element to establish the condition for automatic stop of the engine. However, in the present embodiment, out of the SOC, the evaporator temperature, the brake negative pressure, and the engine coolant temperature, the SOC that is lowest in recovery speed during driving of the engine is adopted as "specified status value" in view of suppressing repetition of automatic stop and automatic restart of the engine in a short cycle.

Specifically, in the present embodiment, the ECU 10 is configured to determine whether or not the SOC is equal to or above a first state of charge. Based on the result of the determination, the ECU 10 determines whether or not to allow the next automatic stop of the engine while the engine is driven by automatic restart after each automatic stop of the engine. When the SOC is equal to or above the first state of charge, the ECU 10 allows the next automatic stop of the engine. When the SOC is less than the first state of charge, the ECU 10 prohibits automatic stop of the engine until the vehicle 1 starts traveling.

"The first state of charge" is a value larger than the second state of charge in the automatic stop condition (6), the value being such that a relatively long time is taken until the automatic stop condition is failed due to decrease in the SOC during automatic stop of the engine. In relation with claims, the region equal to or above the first state of charge corresponds to "first region." The region equal to or above the second state of charge corresponds to "second region."

Since the ECU 10 is configured in this way in the present disclosure, the ECU 10 determines whether or not to allow the next automatic stop of the engine "while the engine is driven by automatic restart after each automatic stop of the engine." Accordingly, when the automatic stop condition is established during stop of the vehicle, automatic stop of the engine is performed at least once. Accordingly, for example, unlike the case of control in which automatic stop of the engine is prohibited without exception when the SOC is equal to or below the specified value, the automatic stop of the engine in normal S&S is unnecessarily restricted. As a consequence, enhancement in fuel efficiency can be achieved.

When the automatic stop condition is failed due to decrease in the SOC or increase in the evaporator temperature or the like, automatic restart of the engine 2 is performed. Accordingly, physical comfort can be maintained by, for example, recovering the SOC or by decreasing the evaporator temperature regardless of during automatic stop of the engine or during driving of the engine by automatic restart.

In addition, in the present disclosure, the next automatic stop of the engine is allowed when the SOC is equal to or above the first state of charge, i.e., when it takes a relatively long time until the stop condition is failed even with decrease in the SOC during automatic stop of the engine. Accordingly, it is possible to secure an opportunity of automatic stop of the engine when it is less likely that automatic stop and automatic restart of the engine is repeated in a short cycle.

On the contrary, when the SOC is less than the first state of charge, i.e., when it is likely that the stop condition is failed in a relatively short time, automatic stop of the engine is prohibited until the vehicle 1 starts traveling. Accordingly, it is possible to reliably avoid the situation where automatic stop and automatic restart of the engine are repeated in a short cycle even though the driver does not perform any operation at all. As a consequence, it becomes possible to suppress the driver feeling busyness or irritation so as to enhance psychological comfort in the vehicle cabin.

Here, when it is assumed that the first state of charge=second state of charge or the first state of charge<the second state of charge, and the automatic stop condition is established under this assumption, repetition of automatic stop and automatic restart of the engine 2 occurs even though the occurrence is in a short cycle. In that case, enhancement in fuel efficiency can be achieved while physical comfort can be provided, but the driver may feel busyness or irritation depending on, for example, the duration of the automatic stop of the engine.

In this regard, in the present embodiment, first state of charge>second state of charge, i.e., a determination criteria for the condition of repetition of automatic stop of the engine is set to be stricter than that for the establishment condition of individual automatic stop of the engine. Accordingly, it is possible to reliably suppress repetition of automatic stop and automatic restart of the engine 2 in a short cycle. Therefore, not only the physical comfort but also the psychological comfort in the vehicle cabin during long temporary stop can be enhanced.

Now, whether or not the SOC is equal to or above the first state of charge may be determined at various timing. For example, whether or not the SOC is equal to or above the first state of charge may be determined while the engine is driven by automatic restart after automatic stop of the engine. Based on the determination result, whether or not to allow the next automatic stop of the engine may be determined. In this way, whether or not to allow the next automatic stop of the engine is determined based on the determination result in real time. This brings about an advantage that repetition of automatic stop and automatic restart of the engine 2 in a short cycle can more reliably be suppressed.

However, in that case, the determination is made based on the SOC after the charged electric power is subjected to consumption or the like during automatic stop of the engine. Accordingly, automatic stop of the engine may assumedly be prohibited even in the case where, for example, the SOC is slightly below the first state of charge due to such reasons as the charged electric power being consumed, but the SOC can still sufficiently be recovered by short-time automatic restart of the engine.

Accordingly, in the present embodiment, the ECU 10 is configured to determine whether or not the SOC is equal to or above the first state of charge before each automatic stop of the engine, and to determine whether or not to allow the next automatic stop of the engine based on the result of the determination made before the last automatic stop of the engine.

For example, when the SOC before the n-th (n is a positive integer) automatic stop of the engine is performed is sufficiently high, then the n+1 st automatic stops of the engine is allowed.

In this case, since the SOC is sufficiently high, the n-th automatic stop of the engine is not terminated in a short time because of the decrease in the SOC. Moreover, since short-time automatic restart of the engine can sufficiently recover the SOC, it is less likely that the n+1st automatic stop of the engine is terminated in a short time because of the decrease in the SOC (long automatic stop of the engine short automatic restart of the engine long automatic stop of the engine).

Assume the case where the long n-th automatic stop of the engine is ended because of the decrease in the SOC, but the SOC is not sufficiently recovered by short-time automatic restart of the engine. In this case, the n+1st automatic stop of the engine is allowed based on the n-th determination made when the SOC is high. It means that the automatic stop condition is established even when the SOC is low in the n+1st determination. Therefore, the n+1st automatic stop of the engine is expected to continue for a certain duration of time, and the n+2nd automatic stop of the engine is going to be prohibited (long automatic stop of the engine→short automatic restart of the engine short automatic stop of the engine→prohibition of automatic stop).

Thus, whether or not to allow the n+1st automatic stop of the engine is determined based on the result of the determination made before the n-th automatic stop of the engine. Accordingly, unnecessary prohibition of automatic stop of the engine can be suppressed. Moreover, since it is less likely that relatively short automatic stop and relatively short automatic restart continue three or more times, the driver feeling busyness or irritation can be suppressed. Therefore, it is possible to perform multi S&S control that allows balanced enhancement in fuel efficiency and in comfort in the vehicle cabin.

When the SOC before the n-th automatic stop of the engine is low, the n+1st automatic stop of the engine is naturally prohibited. Therefore, it is possible to reliably suppress repetition of automatic stop and automatic restart of the engine 2 in a short cycle.

Figure 4:
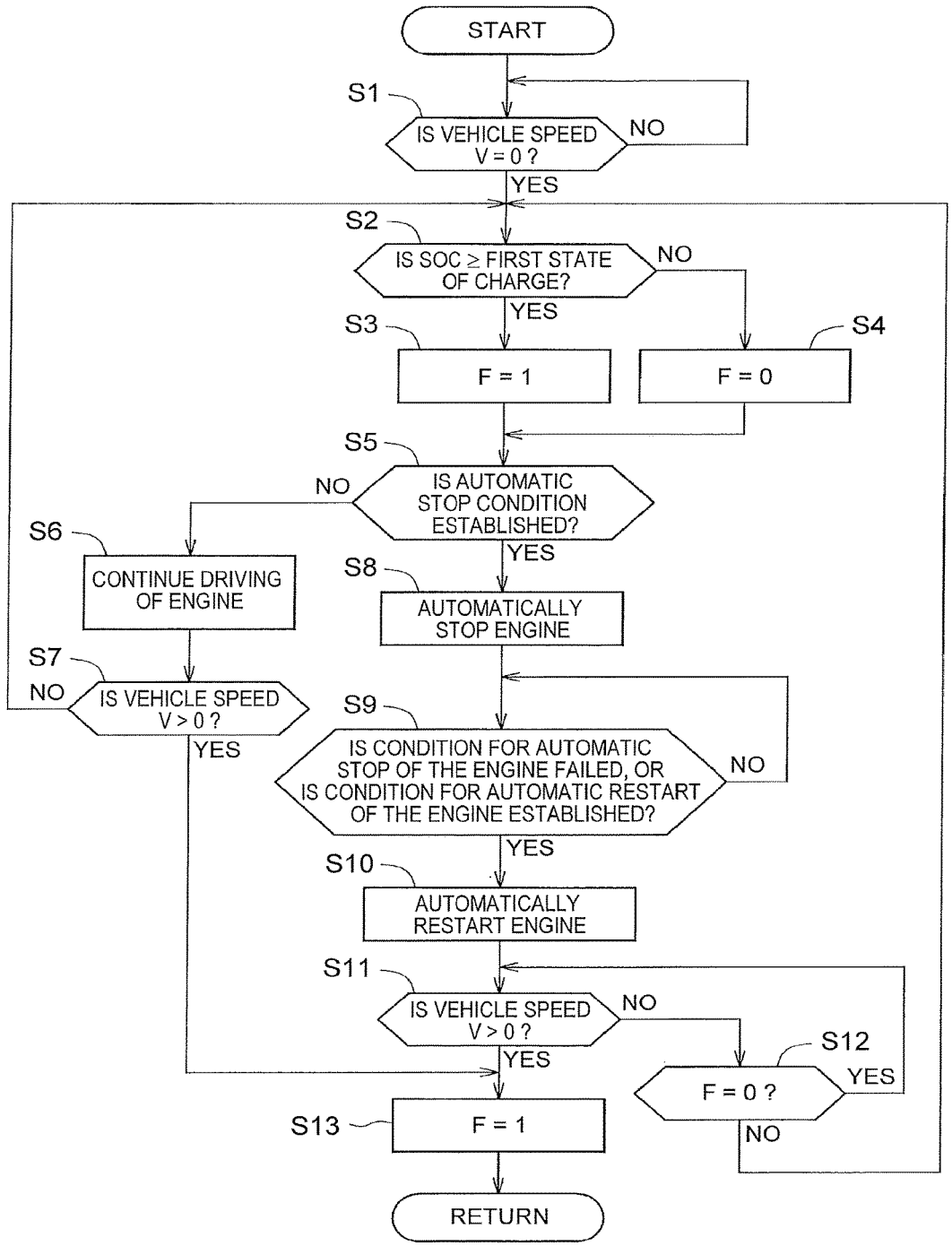
FIG. 4 is a flowchart illustrating one example of multi S&S control.
Figure 5:
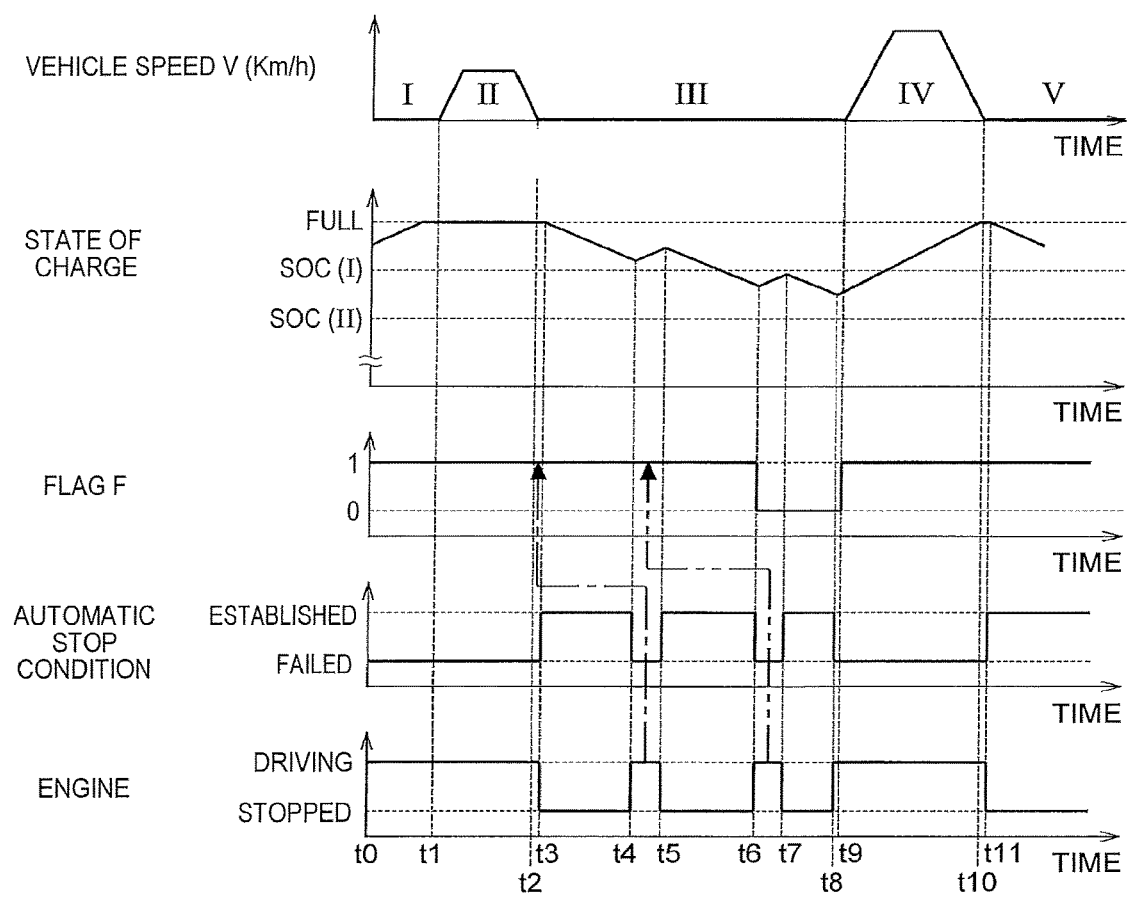
FIG. 5 is a time chart 1 illustrating one example of the multi S&S control.
Figure 6:
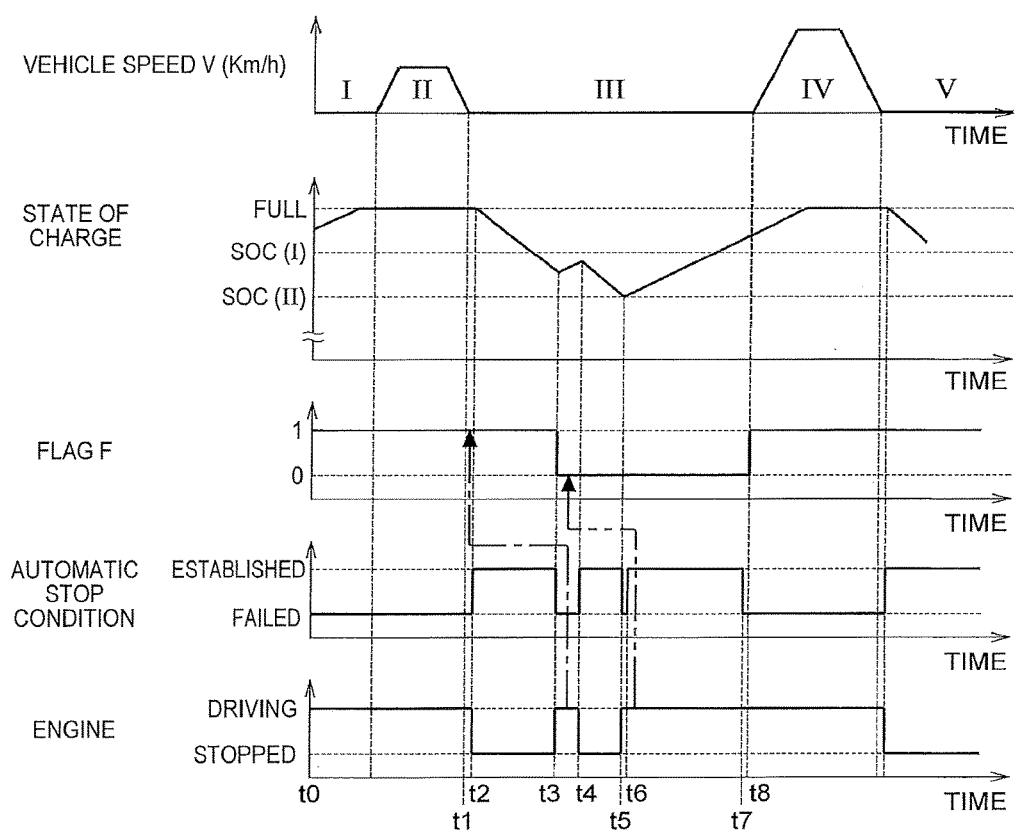
FIG. 6 is a time chart 2 illustrating another example of the multi S&S control.
Figure 7:
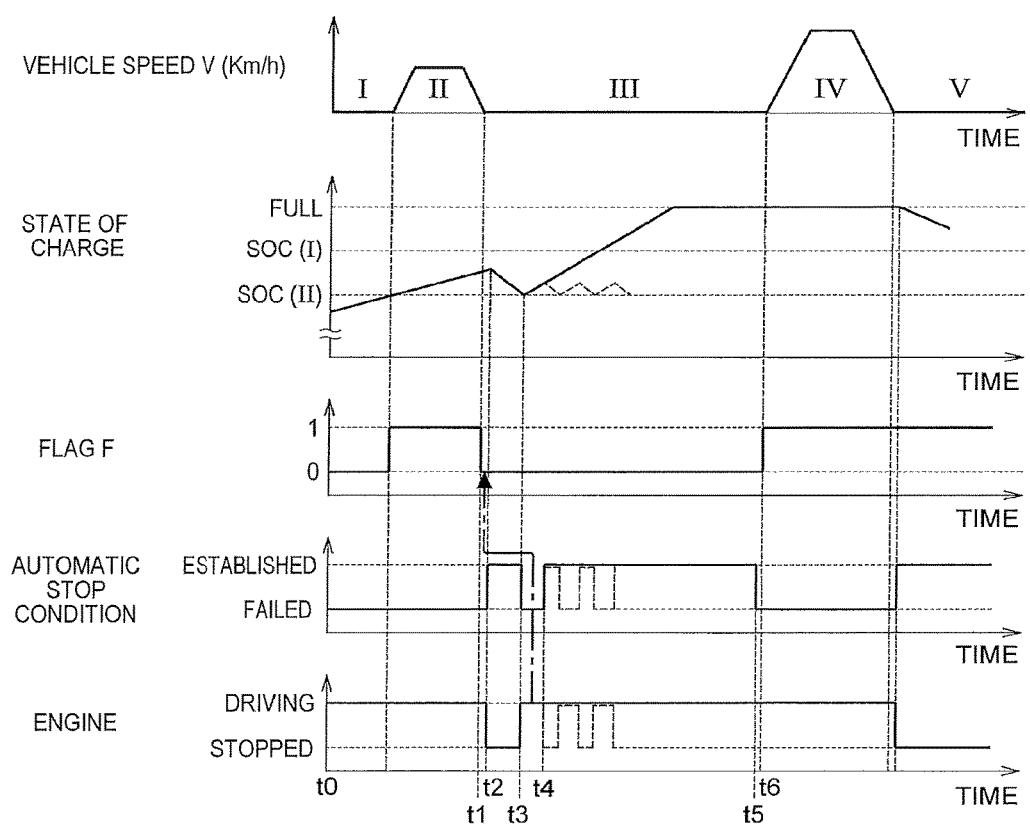
FIG. 7 is a time chart 3 illustrating still another example of the multi S&S control.

A description is now given of one example of the multi S&S control executed by the ECU 10 based on a flowchart illustrated in FIG. 4 with reference to a time chart 1 illustrated in FIG. 5, a time chart 2 illustrated in FIG. 6, and a time chart 3 illustrated in FIG. 7 as needed.

In FIGS. 5 to 7, a section I represents the situation where the ignition switch 42 is set at the start position, a section II represents the situation where the vehicle is traveling, a section III represents the situation where the vehicle is in long temporary stop, a section IV represents the situation where the vehicle is traveling, and a section V represents the situation where the vehicle is in a normal temporary stop. In FIGS. 5 to 7, SOC (I) represents the first state of charge, and SOC (II) represents the second state of charge. The automatic stop condition in FIGS. 5 to 7 includes the conditions (1) to (9). In FIGS. 5 to 7, the parameters such as the state of charge, time, and vehicle speed V are exaggerated for easier understanding of the present disclosure.

First, at time t0 in FIG. 5, the ignition switch 42 is set at the start position to start start-up of the engine 2. At this point, the flowchart of FIG. 4 starts.

In step S1 that is the first step, the ECU 10 determines whether or not the vehicle speed V=0 based on the detection result of wheel speed sensor 45 and the like. Since the vehicle speed V is zero in the section I of FIG. 5, YES is determined in step S1, and the processing proceeds to step S2.

In step S2, the ECU 10 determines whether or not the SOC≥the first state of charge based on the detection result of the SOC sensor 51. Since the SOC>the first state of charge in the section I of FIG. 5, YES is determined in step S2, and the processing proceeds to step S3. In step S3, the ECU 10 sets a flag to F=1, and the processing proceeds to step S5. The flag F=1 indicates that the determination result in step S2 is YES. In other words, the flag F=1 indicates the SOC≥the first state of charge before each automatic stop of the engine is performed. The flag F=0 indicates that the determination result in step S2 is NO. In other words, the flag F=0 indicates that the SOC<the first state of charge before each automatic stop of the engine is performed.

In step S5, the ECU 10 determines whether or not the automatic stop condition is established. In the section I of FIG. 5, while the SOC is sufficient, the parameter such as the engine coolant temperature is assumedly low. As a result, NO is determined in step S5, and the processing proceeds to step S6. In step S6, the ECU 10 continues driving of the engine 2. The processing proceeds to step S7.

In step S7, the ECU 10 determines whether or not the vehicle speed V exceeds zero, i.e., whether or not the vehicle 1 departs. When NO is determined in step S7, the processing returns to step S2 to perform the same determination processing as before. When the vehicle 1 departs at time t1 of FIG. 5, YES is determined in step S7, and the processing proceeds to step S13.

In step S13, the ECU 10 resets the flag to F=1, and the processing returns.

In step S1 after the processing returns, the ECU 10 determines whether or not the vehicle speed V=0. Since the vehicle is driving in the section II of FIG. 5, NO is determined in step S1. Determination of step S1 is repeated until YES is determined, i.e., until the vehicle 1 stops.

When the vehicle 1 stops at time t2 of FIG. 5, YES is determined in step S1, and the processing proceeds to step S2. In step S2, the ECU 10 determines whether or not SOC≥first state of charge. As illustrated in FIG. 5, since the state of charge of the battery 9 becomes full while the vehicle travels, YES is determined in step S2, and the processing proceeds to step S3. In step S3, the ECU 10 resets the flag to F=1, and the processing proceeds to step S5.

In step S5, the ECU 10 determines whether or not the automatic stop condition is established. When the condition for automatic stop of the engine is established at time t3 of FIG. 5, YES is determined in S5, and the processing proceeds to step S8. In step S8, the ECU 10 executes fuel cut control to stop fuel supply to the combustion chamber of the engine 2, so that the engine 2 is automatically stopped, and the processing proceeds to step S9.

In step S9, the ECU 10 determines whether or not the condition for automatic stop of the engine is failed, or whether or not the condition for automatic restart of the engine is established. As illustrated in FIG. 5, the SOC decreases when electric components such as the navigation system and the audio system are used during automatic stop of the engine. However, when, for example, the SOC is not below the second state of charge, NO is determined in step S9. As a result, determination in step S9 is repeated. When any status value (such as the evaporator temperature) other than the SOC is failed (exceeds second temperature) at time t4 of FIG. 5, YES is determined in step S9, and the processing proceeds to step S10.

In step S10, the ECU 10 starts fuel supply to the combustion chamber of the engine 2, and performs automatic restart of the engine 2 with the starter motor 8. The processing then proceeds to step S11. Thus, when the engine 2 is automatically restarted, the decreased state of charge SOC of the battery 9 increases as illustrated in FIG. 5. In step S11, the ECU 10 determines whether or not the vehicle speed V>0. Since the vehicle 1 does not yet depart in FIG. 5, NO is determined in step S11, and the processing proceeds to step S12.

Then, the ECU 10 determines whether or not to allow the next automatic stop of the engine while the engine is driven by the automatic restart (while the engine is driven by automatic restart after each automatic stop of the engine) as illustrated by a chain line arrow of FIG. 5, based on the determination result (flag F=1) of step S3 or the determination result of step S4 (flag F=0) obtained based on the result of the determination (determination in step S2) made before the last automatic stop of the engine.

Specifically, in step S12, the ECU 10 determines whether or not the flag F=0. Here, since the result of the determination (result of the determination of step S3) made before the last automatic stop of the engine is the flag F=1, NO is determined in step S12, and the processing proceeds to step S2. In other words, the ECU 10 allows the next (second) automatic stop of the engine.

In step S2, the ECU 10 determines whether or not the SOC≥the first state of charge. Since the state of charge SOC of the battery 9 is still over the first state of charge as illustrated in FIG. 5, YES is determined in step S2. In step S3, the ECU 10 resets the flag to F=1, and the processing proceeds to step S5.

In step S5, the ECU 10 determines whether or not the automatic stop condition is established. When the automatic stop condition is established at time t5 of FIG. 5, YES is determined in step S5, and the processing proceeds to step S8. In step S8, the ECU 10 automatically stops the engine 2. The processing then proceeds to step S9.

In step S9, the ECU 10 determines again whether or not the condition for automatic stop of the engine is failed, or whether or not the condition for automatic restart of the engine is established. In FIG. 5, the SOC decreases below the first state of charge but is not below the second state of charge. Accordingly, NO is determined in step S9, and determination processing in step S9 is repeated. When any status value other than the SOC is failed at time t6 of FIG. 5, YES is determined in step S9, and the processing proceeds to step S10. In step S10, the ECU 10 automatically restarts the engine 2, and then the processing proceeds to step S11. However, since the vehicle 1 does not yet depart in FIG. 5, NO is determined in step S11, and the processing proceeds to step S12.

Then, the ECU 10 determines whether or not to allow the next automatic stop of the engine while the engine is driven by the automatic restart as illustrated by a two-dot chain line arrow of FIG. 5. As illustrated in FIG. 5, the state of charge SOC of the battery after time t6 is less than the first state of charge. The ECU 10 determines whether or not to allow the next automatic stop of the engine solely based on the result of the determination made before the last automatic stop of the engine. Accordingly, since the determination result of step S3 is the flag F=1, NO is determined in step S12, and the processing proceeds to step S2. In other words, the ECU 10 also allows the next (third) automatic stop of the engine.

In step S2, the ECU 10 determines whether or not the SOC≥the first state of charge. Since the state of charge SOC of the battery 9 is below the first state of charge as illustrated in FIG. 5, NO is determined in step S2, and the ECU 10 resets the flag to F=0 in step S4. Then, the processing proceeds to step S5. When the automatic stop condition is established at time t7 of FIG. 5, YES is determined in step S5, and the processing proceeds to step S8. In step S8, the ECU 10 automatically stops the engine 2. Then, the processing proceeds to step S9.

At time t8 of FIG. 5, when the driver steps on the accelerator pedal 14 and turns on the brake, for example, YES is determined in step S9. In step S10, the ECU 10 performs automatic restart of the engine 2, and then the processing proceeds to step S11. When the vehicle 1 departs at time t9 of FIG. 5, YES is determined in step S11, and the processing proceeds to step S13.

In step S13, the ECU 10 changes the flag F=0 to flag F=1, and then the processing returns.

In step S1 after the processing returns, the ECU 10 determines whether or not the vehicle speed V=0. Since the vehicle is driving in the section IV of FIG. 5, NO is determined in step S1. Determination processing in step S1 is repeated until the vehicle 1 stops.

When the vehicle 1 stops at time t10 of FIG. 5, and the automatic stop condition is established at time t11, the same processing as in the case of the section III of FIG. 5 is performed.

Thus, when the SOC is high, it is possible to reliably suppress, during a long temporary stop (section III), repetition of automatic stop and automatic restart of the engine 2 in a short cycle in the order of relatively long first automatic stop of the engine (time t3 to t4)→relatively short first automatic restart of the engine (time t4 to t5)→relatively long second automatic stop of the engine (time t5 to t6)→relatively short second automatic restart of the engine (time t6 to t7)→relatively long third automatic stop of the engine (time t7 to t8). Since the engine 2 is automatically stopped during the most part of the long temporary stop as illustrated in FIG. 5, considerable enhancement in fuel efficiency can be achieved.

Time Chart 2

Since a section I, a section II, and a section V in the time chart 2 are redundant with those in the time chart 1, the description thereof is omitted.

When the vehicle 1 stops at time t1 of FIG. 6, YES is determined in step S1, and the processing proceeds to step S2. In step S2, the ECU 10 determines whether or not the SOC≥the first state of charge. As illustrated in FIG. 6, since the state of charge of the battery 9 becomes full during traveling of the vehicle, YES is determined in S2, and the processing proceeds to step S3. In step S3, the ECU 10 resets the flag to F=1, and the processing proceeds to step S5.

In step S5, the ECU 10 determines whether or not the automatic stop condition is established. When the condition for automatic stop of the engine is established at time t2 of FIG. 6, YES is determined in S5, and the processing proceeds to step S8. In step S8, the ECU 10 automatically stops the engine 2. Then, the processing proceeds to step S9.

In step S9, the ECU 10 determines whether or not the condition for automatic stop of the engine is failed, or whether or not the condition for automatic restart of the engine is established. In the case of FIG. 6, the SOC rapidly decreases because the lighting devices and the seat heater as well as the navigation system and the audio system are used during automatic stop of the engine. Accordingly, the SOC is below the first state of charge. However, since the SOC is not below, for example, the second state of charge, NO is determined in step S9, and determination processing in step S9 is repeated. When any status value other than the SOC is failed at time t3 of FIG. 6, YES is determined in step S9, and the processing proceeds to step S10.

In step S10, the ECU 10 automatically starts the engine 2. Then, the processing proceeds to step S11. Thus, when the engine 2 is automatically restarted, the decreased SOC increases as illustrated in FIG. 6. In step S11, the ECU 10 determines whether or not the vehicle speed V>0. Since the vehicle 1 does not yet depart in FIG. 6, NO is determined in step S11, and the processing proceeds to step S12.

Then, the ECU 10 determines whether or not to allow the next automatic stop of the engine based on the result of the determination made before the last automatic stop of the engine, while the engine is driven by the automatic restart as illustrated by a chain line arrow of FIG. 6. Specifically, in step S12, the ECU 10 determines whether or not the flag F=0. Here, since the result of the determination (result of the determination of step S3) made before the last automatic stop of the engine is the flag F=1, NO is determined in step S12, and the processing proceeds to step S2. In other words, the ECU 10 allows the next (second) automatic stop of the engine.

In step S2, the ECU 10 determines whether or not the SOC the first state of charge. As illustrated in FIG. 6, since the SOC is below the first state of charge, NO is determined in step S2, and the processing proceeds to step S4. In step S4, the ECU 10 resets the flag to F=0, and the processing proceeds to step S5.

In step S5, the ECU 10 determines whether or not the automatic stop condition is established. When the automatic stop condition is established at time t4 of FIG. 6, YES is determined in step S5, and the processing proceeds to step S8. In step S8, the ECU 10 causes automatic stop of the engine 2. Then, the processing proceeds to step S9.

In step S9, the ECU 10 determines whether or not the condition for automatic stop of the engine is failed, or whether or not the condition for automatic restart of the engine is established. At time t5 of FIG. 6, the SOC rapidly decreases below the second state of charge. Accordingly, YES is determined in step S9, and the processing proceeds to step S10. In step S10, the ECU 10 automatically restarts the engine 2. Then, the processing proceeds to step S11. Since the vehicle 1 does not yet depart in FIG. 6, NO is determined in step S11, and the processing proceeds to step S12. When the engine 2 automatically restarts, the SOC is recovered. Accordingly, at time t6 after the lapse of very small time from time t5, the automatic stop condition itself is established.

Then, the ECU 10 determines whether or not to allow the next automatic stop of the engine while the engine is driven by the automatic restart as illustrated by a two-dot chain line arrow of FIG. 6. Since the determination result of step S4 is the flag F=0, YES is determined by the ECU 10 in step S12, the processing proceeds to step S11 again. The flow of step S12 to step S11 is repeated until YES is determined in step S11. In other words, the ECU 10 prohibits automatic stop of the engine until the vehicle 1 starts traveling.

At time t7 of FIG. 6, for example, when the driver steps on the accelerator pedal 14 and turns on the brake, and at time t8 of FIG. 6, the vehicle 1 departs, YES is determined in step S11. The processing then proceed to step S13.

In step S13, after the ECU 10 changes the flag F=0 to flag F=1, i.e., after the ECU 10 cancels prohibition of automatic stop of the engine, the processing returns.

Thus, when the SOC is high but discharge speed is fast, it is possible to suppress, during a long temporary stop (section III), the situation where automatic stop and automatic restart of the engine 2 are repeated three or more times in short cycle in the order of relatively long first automatic stop of the engine (time t2 to t3)→relatively short first automatic restart of the engine (time t3 to t4)→relatively short second automatic stop of the engine (time t4 to t5)→prohibition of automatic stop (time t5 and onward). Even when a large amount of electric power is consumed while the vehicle stops, enhancement in fuel efficiency can be achieved by stopping the engine 2 as much as possible.

In the time chart 3, the case of a low SOC at time t0 will be described. Since a section I, a section II, and a section V in the time chart 3 are redundant with those in the time chart 1 except for the point that the flag becomes zero in the section I due to the low SOC, the description thereof is omitted.

When the vehicle 1 stops at time t1 of FIG. 7, YES is determined in step S1, and the processing proceeds to step S2. In step S2, the ECU 10 determines whether or not the SOC≥the first state of charge. As illustrated in FIG. 7, since the SOC is below the first state of charge, NO is determined in S2, and the processing proceeds to step S4. In step S4, the ECU 10 resets the flag to F=0, and the processing proceeds to step S5.

In step S5, the ECU 10 determines whether or not the automatic stop condition is established. When the automatic stop condition is established at time t2 of FIG. 7, YES is determined in step S5, and the processing proceeds to step S8. In step S8, the ECU 10 automatically stops the engine 2. Then, the processing proceeds to step S9.

In step S9, the ECU 10 determines whether or not the condition for automatic stop of the engine is failed, or whether or not the condition for automatic restart of the engine is established. In the case of FIG. 7, the SOC is below the second state of charge at time t3. Accordingly, YES is determined in step S9, and the processing proceeds to step S10.

In step S10, the ECU 10 automatically restarts the engine 2. Then, the processing proceeds to step S11. Thus, when the engine 2 is automatically restarted, the SOC is recovered. Accordingly, as illustrated in FIG. 7, the automatic stop condition itself is established at time t4. In step S11, the ECU 10 determines whether or not the vehicle speed V>0. Since the vehicle 1 does not yet depart in FIG. 7, NO is determined in step S11, and the processing proceeds to step S12.

Then, the ECU 10 determines whether or not to allow the next automatic stop of the engine based on the result of the determination made before the last automatic stop of the engine, while the engine is driven by the automatic restart as illustrated by a chain line arrow of FIG. 7. Specifically, in step S12, the ECU 10 determines whether or not the flag F=0. Here, since the result of the determination (result of the determination of step S43) made before the last automatic stop of the engine is the flag F=0, YES is determined in step S12, and the processing proceeds to step S11 again. The flow of step S12 to step S11 is repeated until YES is determined in step S11. In other words, the ECU 10 prohibits automatic stop of the engine until the vehicle 1 starts traveling.

At time t5 of FIG. 7, for example, when the driver steps on the accelerator pedal 14 and turns on the brake, and at time t6 of FIG. 7, the vehicle 1 departs, YES is determined in step S11. The processing then proceed to step S13.

In step S13, after the ECU 10 changes the flag F=0 to flag F=1, i.e., after the ECU 10 cancels prohibition of automatic stop of the engine, the processing returns.

Thus, when the SOC is low, the second and subsequent automatic stop of the engine is prohibited during long temporary stop (section III). Accordingly, it is possible to reliably suppress repetition of automatic stop and automatic restart of the engine 2 in a short cycle as illustrated by a thick dashed line in the column of the state of charge, the column of the automatic stop condition, and the column of the engine in FIG. 7. In the case where such repetition is suppressed, initial automatic stop of the engine is still performed when the automatic stop condition itself is established. Therefore, minimum enhancement in fuel efficiency can be achieved.

As described in the foregoing, the present embodiment makes it possible to perform multi S&S control that allows balanced enhancement in fuel efficiency and in comfort in the vehicle cabin depending on various situations such as the case where the SOC is high (time chart 1), the case where the SOC is high but the discharge speed is fast (time chart 2), and the case where the SOC is low (time chart 3). Therefore, it is possible to achieve enhancement in fuel efficiency while enhancing both physical comfort and psychological comfort in the vehicle cabin during long temporary stop.

In relation with claims, the processing of step S2 executed by the ECU 10 corresponds to the processing as "the electronic control unit that determines whether or not a status value is in a first region." The processing of step S12 executed by the ECU 10 corresponds to the processing as "the electronic control unit that determines, based on a result of the determination by the determination means, whether or not to allow the next automatic stop of the engine while the engine is driven by automatic restart after each automatic stop of the engine." The processing of step S12→steps S2 to S5→step S8 corresponds to the processing as "the electronic control unit that allows the next automatic stop of the engine when determining that the status value is in the first region." The processing of step S12→step S11→step S13 corresponds to the processing as "the electronic control unit that prohibits automatic stop of the engine until the vehicle starts traveling, when determining that the status value is out of the first region."

Without being limited to the embodiment, the present disclosure can be implemented in other various forms, without departing from the spirit or principal characteristics of the present disclosure.

In the embodiment, the SOC is adopted as "the specified status value." Without being limited thereto, parameters such as evaporator temperature, brake negative pressure, and engine coolant temperature may be adopted as "the specified status value." For example, when the evaporator temperature is adopted as "the specified status value", the ECU 10 may be configured to: determine whether or not the temperature of the evaporator 22 is equal to or below the first temperature; determine based on the result of the determination whether or not to allow the next automatic stop of the engine while the engine is driven by automatic restart after each automatic stop of the engine; and allow the next automatic stop of the engine when the temperature of the evaporator 22 is equal to or below the first temperature, and prohibit automatic stop of the engine until the vehicle 1 start traveling, when the temperature of the evaporator 22 exceeds the first temperature.

In the embodiment, before each automatic stop of the engine is performed, whether or not the SOC the first state of charge is determined, and whether or not to allow the next automatic stop of the engine is determined based on the result of the determination made before the last automatic stop of the engine. However, the present disclosure is not limited thereto. Whether or not the SOC≥the first state of charge may be determined at various timing. For example, as described in the foregoing, whether or not the SOC is equal to or above the first state of charge may be determined while the engine is driven by automatic restart after automatic stop of the engine, and based on the determination result, whether or not to allow the next automatic stop of the engine may be determined.

In this way, whether or not to allow the next automatic stop of the engine is determined based on the determination result in real time. This brings about an advantage that repetition of automatic stop and automatic restart of the engine 2 in a short cycle can more reliably be suppressed.

Furthermore, whether or not to allow the next automatic stop of the engine may be determined, for example, based on both the result of the determination made before the last automatic stop of the engine and the result of the determination made during driving of the engine by automatic restart. In this way, whether or not to allow the next automatic stop of the engine is determined based on both the results of the determination made before consumption and after consumption (after recovery) of electric charge. As a result, more finely-tuned control can be performed.

Although the present disclosure is applied to the vehicle 1 including the gasoline engine 2 in the embodiment, the present disclosure is not limited thereto. For example, the present disclosure may be applied to vehicles including a diesel engine.

Furthermore, in the embodiment, the automatic transmission is the stepped automatic transmission 4. However, without being limited thereto, the automatic transmission may be a belt-type stepless automatic transmission, for example.

In the embodiment, the control apparatus is constituted of one ECU 10. However, without being limited thereto, the control apparatus may be constituted of, for example, units such as an engine ECU that mainly performs output control of the engine 2, an economical running ECU that performs S&S control or multi S&S control, an air-conditioning ECU that regulates an air blow volume and an air blow temperature of the air conditioner 7, and a transmission ECU that controls the automatic transmission 4, which are connected through a CAN communication line so as to be able to exchange information with each other.

Thus, the embodiment disclosed is in all respects illustrative and is not considered as the basis for restrictive interpretation. Furthermore, modifications and arrangements in the range of the claims and the equivalency thereof are intended to be embraced in the range of the present disclosure.

The present disclosure makes it possible to achieve enhancement in fuel efficiency while enhancing both physical comfort and psychological comfort in the vehicle cabin during long temporary stop. Accordingly, the present disclosure is exceedingly useful when it is applied to a control apparatus of an engine that can perform S&S control a plurality of times at one time when a vehicle stops.

What is claimed is:

1. A control apparatus for a vehicle, the vehicle including an engine,
   the control apparatus comprising:
      an electronic control unit being able to execute restart control a plurality of times at one time when the vehicle stops, the restart control being a control that automatically stops the engine when a specified automatic stop condition is established and automatically restarts the automatically stopped engine either when a specified automatic restart condition is established or when the automatic stop condition is not satisfied, the automatic stop condition including a specified status value that changes toward a unsatisfied side of the automatic stop condition during automatic stop of the engine, and changes toward an establishment side of the automatic stop condition during driving of the engine;
      the electronic control unit being configured to determine whether or not the status value is in a first region, the first region being such that a relatively long time is taken until the automatic stop condition is not satisfied due to change in the status value during automatic stop of the engine;
      the electronic control unit being configured to decide, based on a result of determination made by the electronic control unit, whether or not to allow a next automatic stop of the engine while the engine is driven by automatic restart after each automatic stop of the engine; and
      while the engine is driven by automatic restart and the vehicle is not moving, the electronic control unit being configured to allow the next automatic stop of the engine when determining that the status value is in the first region, and to prohibit automatic stop of the engine until the vehicle starts traveling, when determining that the status value is out of the first region,
   wherein the automatic stop condition includes that the status value is in a second region, and
   wherein the second region includes the first region and a region other than the first region such that the second region is larger than the first region.

2. The control apparatus for the vehicle according to claim 1, wherein
   the electronic control unit is configured to execute the determination before each automatic stop of the engine is performed, and
   the electronic control unit is configured to decide whether or not to allow the next automatic stop of the engine based on the result of the determination executed before last automatic stop of the engine.

3. The control apparatus for the vehicle according to claim 1, wherein
   the status value is a value out of a state of charge of a battery, an evaporator temperature of an air conditioning device, a negative brake pressure, and an engine coolant temperature, the value having a lowest speed in change toward the establishment side of the automatic stop condition during driving of the engine.

4. A control method of a vehicle, the vehicle including an engine and an electronic control unit, the electronic control unit being able to execute restart control a plurality of times at one time when the vehicle stops, the control method comprising:

determining, by the electronic control unit, whether or not a status value is in a first region;

deciding, by the electronic control unit, based on a result of determination made by the electronic control unit, whether or not to allow a next automatic stop of the engine while the engine is driven by automatic restart after each automatic stop of the engine; and while the engine is driven by automatic restart and the vehicle is not moving, allowing, by the electronic control unit, the next automatic stop of the engine when determining that the status value is in the first region, and prohibiting automatic stop of the engine until the vehicle starts traveling, when determining that the status value is out of the first region, the restart control being a control that automatically stops the engine when a specified automatic stop condition is established and automatically restarts the automatically stopped engine either when a specified automatic restart condition is established or when the automatic stop condition is not satisfied, the automatic stop condition including a specified status value that changes toward a unsatisfied side of the automatic stop condition during automatic stop of the engine, and changes toward an establishment side of the automatic stop condition during driving of the engine, and the first region being such that a relatively long time is taken until the automatic stop condition is not satisfied due to change in the status value during automatic stop of the engine, wherein the automatic stop condition includes that the status value is in a second region, and wherein the second region includes the first region and a region other than the first region such that the second region is larger than the first region.

* * * * *